United States Patent
Hou et al.

(10) Patent No.: US 11,780,149 B2
(45) Date of Patent: Oct. 10, 2023

(54) WINDING DEVICE FOR PRODUCING FIBER COMPOSITE LOOP CHAIN AND WINDING METHOD

(71) Applicant: Harbin FRP Institute Co., Ltd., Harbin (CN)

(72) Inventors: Diyang Hou, Harbin (CN); Yongchun Liu, Harbin (CN); Hua Zhang, Harbin (CN); Yunfeng Zhang, Harbin (CN); Ruiqing Yang, Harbin (CN); Yang Liu, Harbin (CN); Chundong Fei, Harbin (CN); Liang Zhao, Harbin (CN); Jiliang Jiang, Harbin (CN)

(73) Assignee: HARBIN FRP INSTITUTE CO., LTD., Harbin (CN)

( * ) Notice: Subject to any disclaimer, the term of this patent is extended or adjusted under 35 U.S.C. 154(b) by 205 days.

(21) Appl. No.: 17/517,749

(22) Filed: Nov. 3, 2021

(65) Prior Publication Data
US 2022/0055282 A1 Feb. 24, 2022

(30) Foreign Application Priority Data
Mar. 24, 2021 (CN) .......................... 202110315188.9

(51) Int. Cl.
*F16G 13/12* (2006.01)
*B29C 53/62* (2006.01)
(Continued)

(52) U.S. Cl.
CPC .......... *B29C 53/62* (2013.01); *B29C 53/8016* (2013.01); *F16G 13/12* (2013.01); *B29C 2053/8025* (2013.01); *B29L 2031/12* (2013.01)

(58) Field of Classification Search
CPC .......... B21L 99/00; B21L 19/00; F16G 13/12
See application file for complete search history.

(56) References Cited

U.S. PATENT DOCUMENTS

| 4,757,681 A * | 7/1988 | Matsuno ................. F16G 13/06 59/5 |
| 4,779,411 A * | 10/1988 | Kendall ................. D07B 7/165 428/7 |

(Continued)

FOREIGN PATENT DOCUMENTS

| WO | WO-2008089798 A1 * | 7/2008 | ............. B66C 1/125 |
| WO | WO-2009115249 A1 * | 9/2009 | ............. D07B 5/005 |

*Primary Examiner* — Bobby Yeonjin Kim
(74) *Attorney, Agent, or Firm* — IPRO, PLLC

(57) ABSTRACT

The present disclosure provides a winding device for producing a fiber composite loop chain and a winding method, and belongs to the field of production equipment. The problem that an existing composite loop chain forming technology has tension defects is solved. The winding device includes a main shaft assembly, a clamp pushing-in mechanism, travel switch assemblies, a mold pushing mechanism, a clamp pulling-out mechanism, a positioning and clamping mechanism and a tension control mechanism which are fixedly connected to a rack. The main shaft assembly includes a driving mechanism, a bearing pedestal, a rotating main shaft, clamp sliding shafts and a supporting block. The driving mechanism is connected with one end of the rotating main shaft, and the other end of the rotating main shaft is connected with the supporting block. The rotating main shaft is connected with the bearing pedestal through a bearing, and the bearing pedestal is fixed to the rack. Two clamp sliding shafts are provided. The two clamp sliding shafts are symmetrically arranged along the rotating main shaft and are in sliding connection with the supporting block, and clamps are installed on the clamp sliding shafts. The winding device and the winding method are mainly used for producing the fiber composite loop chain.

10 Claims, 18 Drawing Sheets

(51) Int. Cl.
*B29C 53/80* (2006.01)
*B29L 31/12* (2006.01)

(56) References Cited

U.S. PATENT DOCUMENTS

| | | | | |
|---|---|---|---|---|
| 10,870,930 | B2* | 12/2020 | Bosman | F16G 13/12 |
| 2003/0213225 | A1* | 11/2003 | Disegna | B21F 23/00 |
| | | | | 59/35.1 |
| 2010/0257835 | A1* | 10/2010 | de Vries | F16G 13/14 |
| | | | | 59/35.1 |

* cited by examiner

WINDING DEVICE FOR PRODUCING FIBER COMPOSITE LOOP CHAIN AND WINDING METHOD

TECHNICAL FIELD

The present disclosure belongs to the field of production equipment, and particularly relates to a winding device for producing a fiber composite loop chain and a winding method.

BACKGROUND

A loop chain is an essential key part for military ship parking, and the military has a clear standard stipulation on the loop chain. At present, a loop chain lockset of the ship in China is made of a steel material, the huge weight of the loop chain lockset invisibly brings operation difficulty and energy loss, and meanwhile the performance of the ship is affected. Compared with the steel material, a composite has the advantage of high specific strength, that is, the strength of the composite is much higher than that of steel under the condition of equal weight. Composites have been used in many fields in the world and in China, especially in aerospace and military products. It is contemplated to use the composite instead of the steel material to manufacture the loop chain, so as to reduce the weight and improve the strength of loop chains of existing military ships.

At present, a composite loop chain forming method includes two process modes of 3D printing and laying and mould-pressing. Both of the two process modes have tension defects, the effectiveness of fiber tension directly affects the performance of the loop chain, and a device and method capable of directly winding a composite loop chain are lacked at present.

SUMMARY

In order to solve the problems in the prior art, the present disclosure provides a winding device for producing a fiber composite loop chain and a winding method.

In order to achieve the above objective, the present disclosure adopts the following technical solution: a winding device for producing the fiber composite loop chain includes a main shaft assembly, a clamp pushing-in mechanism, travel switch assemblies, a mold pushing mechanism, a clamp pulling-out mechanism, a positioning and clamping mechanism and a tension control mechanism which are fixedly connected to a rack. The main shaft assembly includes a driving mechanism, a bearing pedestal, a rotating main shaft, clamp sliding shafts and a supporting block. The driving mechanism is connected with one end of the rotating main shaft, and the other end of the rotating main shaft is connected with the supporting block. The rotating main shaft is connected with the bearing pedestal through a bearing, and the bearing pedestal is fixed on the rack. Two clamp sliding shafts are provided. The two clamp sliding shafts are symmetrically arranged along the rotating main shaft; the clamp sliding shafts are slidably connected with the supporting block; and each clamp sliding shaft is provided with a clamp. The clamp pushing-in mechanism and the clamp pulling-out mechanism are respectively arranged at two sides of the main shaft assembly. The clamp pushing-in mechanism pushes one clamp sliding shaft through an air cylinder, and the clamp pulling-out mechanism pulls the other clamp sliding shaft through an air cylinder. The mold pushing mechanism is arranged at a front end of the main shaft assembly. The mold pushing mechanism includes a first pushing air cylinder, a second pushing air cylinder, clamping blocks and a linear guide track. The first pushing air cylinder and the second pushing air cylinder are arranged symmetrically; a front end of each air cylinder rod is connected with a clamping block; and the two clamping blocks are arranged oppositely. Bottom ends of the clamping blocks are connected with the linear guide track. Multiple travel switch assemblies are provided. The multiple travel switch assemblies are respectively arranged at the positions of the clamp pushing-in mechanism, the clamp pulling-out mechanism, the supporting block, the first pushing air cylinder and the second pushing air cylinder. The positioning and clamping mechanism is arranged at a front end of the mold pushing mechanism. The positioning and clamping mechanism includes a support, clamp forceps, a positioning block, a supporting plate and a positioning finished ring. The support is connected with the rack. The clamp forceps are connected with the support in a hinged manner. The positioning block and the supporting plate are fixedly connected with the support. The positioning finished ring is assembled with the to-be-wound mold and a finished ring respectively in a sleeving manner. The positioning finished ring is clamped on the positioning block and the supporting plate. The tension control mechanism provides winding tension for winding fibers and guides the winding fibers onto the to-be-wound mold.

Further, the driving mechanism includes a servo motor and a reducer. An output end of the servo motor is connected with an input end of the reducer, and an output end of the reducer is connected with the rotating main shaft through a coupler.

Further, the main shaft assembly further includes a locking nut, a guide pin, impact iron, a clamp expansion block and a linear bearing. The rotating main shaft is locked onto the bearing pedestal through the locking nut. An upper end of the guide pin is fixed to the position of a center line of the clamp sliding shaft in a threaded manner, and a lower end of the guide pin is of a pin structure and is matched with an upper key slot in the clamp sliding shaft. The impact iron is arranged at one side of the supporting block. The clamp expansion block is of a wedge-shaped structure and is arranged in a groove in a front end of the clamp. The linear bearing is arranged between the clamp sliding shaft and the supporting block.

Further, the clamp pushing-in mechanism includes an ejection sleeve and a pushing-in air cylinder. The ejection sleeve is connected with a cylinder rod of the pushing-in air cylinder. The pushing-in air cylinder is connected with a pushing-in air cylinder base, and the pushing-in air cylinder base is connected with the rack. The clamp pulling-out mechanism includes a pulling sleeve and a pulling-out air cylinder. The pulling sleeve is connected with a cylinder rod of the pulling-out air cylinder. The pulling-out air cylinder is connected with a pulling-out air cylinder base, and the pulling-out air cylinder base is connected with the rack.

Further, the travel switch assembly includes a proximity travel switch, a height adjusting frame and a fixing frame. The proximity travel switch is in screwed connection with the height adjusting frame, and the height adjusting frame is in screwed connection with the fixing frame.

Further, the mold pushing mechanism further includes an adjusting screw, an upper positioning plate and a guide groove. The adjusting screw is connected with a base through front and rear ends by a sliding sleeve. The first pushing air cylinder and the second pushing air cylinder are respectively mounted on the base. One end of the adjusting screw is connected with a hand wheel. The upper positioning plate is fixedly connected onto the clamping blocks. The guide groove is fixed on the rack. The clamping blocks are connected with the guide groove in a sliding fit manner. The linear guide track includes a sliding block and a track. The clamping blocks are fixedly connected with the sliding block. The sliding block is slidably connected with the track.

Further, the tension control mechanism includes a connecting support, a yarn guide groove, a yarn combing assembly, a yarn ball tensioner, a tension adjuster, a yarn ball, a yarn ball locking nut, a yarn guide wheel, a guide hinge pin and a wheel shaft. The connecting support is fixedly connected with the rack. The yarn guide groove is connected with the connecting support. A yarn outlet end of the yarn guide groove is provided with the yarn guide wheel, and a yarn inlet end of the yarn guide groove is provided with the yarn combing assembly. The yarn ball tensioner is connected with the connecting support. The tension adjuster is connected with the yarn ball tensioner. The yarn ball is arranged on the yarn ball tensioner. The yarn ball tensioner locks the yarn ball through the yarn ball locking nut. The yarn guide wheel is connected with the wheel shaft through the guide hinge pin. The wheel shaft is connected with the yarn guide groove.

Further, the to-be-wound mold is of a multi-pedal split structure.

Further, ten travel switch assemblies are provided, and are respectively a first travel switch assembly, a second travel switch assembly, a third travel switch assembly, a fourth travel switch assembly, a fifth travel switch assembly, a sixth travel switch assembly, a seventh travel switch assembly, an eighth travel switch assembly, a ninth travel switch assembly and a tenth travel switch assembly. The first travel switch assembly and the second travel switch assembly are arranged at two travel positions of the clamp pushing-in mechanism. The fourth travel switch assembly and the fifth travel switch assembly are arranged at two travel positions of the clamp pulling-out mechanism. The third travel switch assembly and the sixth travel switch assembly are symmetrically arranged at two sides of the supporting block. The seventh travel switch assembly and the eighth travel switch assembly are arranged at two travel positions of the first pushing air cylinder. The ninth travel switch assembly and the tenth travel switch assembly are arranged at two travel positions of the second pushing air cylinder.

The present disclosure further provides a winding method of the winding device for producing the fiber composite loop chain, which includes the following steps:

step 1: clamping the to-be-wound mold assembled with the finished ring in a sleeving manner onto the positioning and clamping mechanism, controlling the second pushing air cylinder to eject so as to clamp the to-be-wound mold between the clamping blocks, at this moment, enabling the ejection sleeve of the pushing-in air cylinder to trigger the first travel switch assembly, enabling the impact iron on the supporting block to trigger the third travel switch assembly, enabling the pulling sleeve of the pulling-out air cylinder to trigger the fifth travel switch assembly, enabling the impact iron of the first pushing air cylinder to trigger the seventh travel switch assembly, and enabling the impact iron of the second pushing air cylinder to trigger the ninth travel switch assembly;

step 2: starting a winding start button, enabling the air cylinder to eject so as to push the clamp into the to-be-wound mold and then withdrawing the air cylinder, at this moment, enabling the ejection sleeve of the pushing-in air cylinder to trigger the second travel switch assembly, withdrawing the second pushing air cylinder, and enabling the impact iron of the second pushing air cylinder to trigger the tenth travel switch assembly;

step 3: driving the to-be-wound mold to rotate anticlockwise by 180 degrees through the rotating main shaft, at this moment, enabling the impact iron on the supporting block to trigger the sixth travel switch assembly, enabling the first pushing air cylinder to eject the to-be-wound mold, and meanwhile, enabling the impact iron of the first pushing air cylinder to trigger the eighth travel switch assembly;

step 4: withdrawing the pulling-out air cylinder, pulling the clamp out of the to-be-wound mold, enabling the pulling sleeve of the pulling-out air cylinder to trigger the fourth travel switch assembly and then stretch out to return to the original position to trigger the fifth travel switch assembly, enabling the second pushing air cylinder to eject and push the to-be-wound mold to move leftwards, enabling the impact iron of the second pushing air cylinder to trigger the ninth travel switch assembly, withdrawing the first pushing air cylinder, enabling the impact iron of the first pushing air cylinder to trigger the seventh travel switch assembly, and at this moment, enabling the to-be-wound mold to return to the initial position to complete semi-circle winding; and step 5: repeating the step 1 to the step 4 to complete winding of the loop chain.

Compared with the prior art, the present disclosure has the beneficial effects that the problem that an existing composite loop chain forming technology has tension defects is solved. According to the present disclosure, a loop chain is directly wound with fibers, and thus, tension of the fibers is guaranteed. The fiber composite loop chain produced by the present disclosure can be used as an anchor chain of a military ship, and has great significance in reducing energy consumption and increasing the speed of the ship. According to the present disclosure, a winding process of a sleeving loop chain is realized, the production process of the sleeving loop chain is simplified, the fiber winding tension is accurately controlled in terms of quantity, the forming time is greatly shortened, the labor intensity of technicians is reduced, and the production efficiency is improved.

Figure 1:
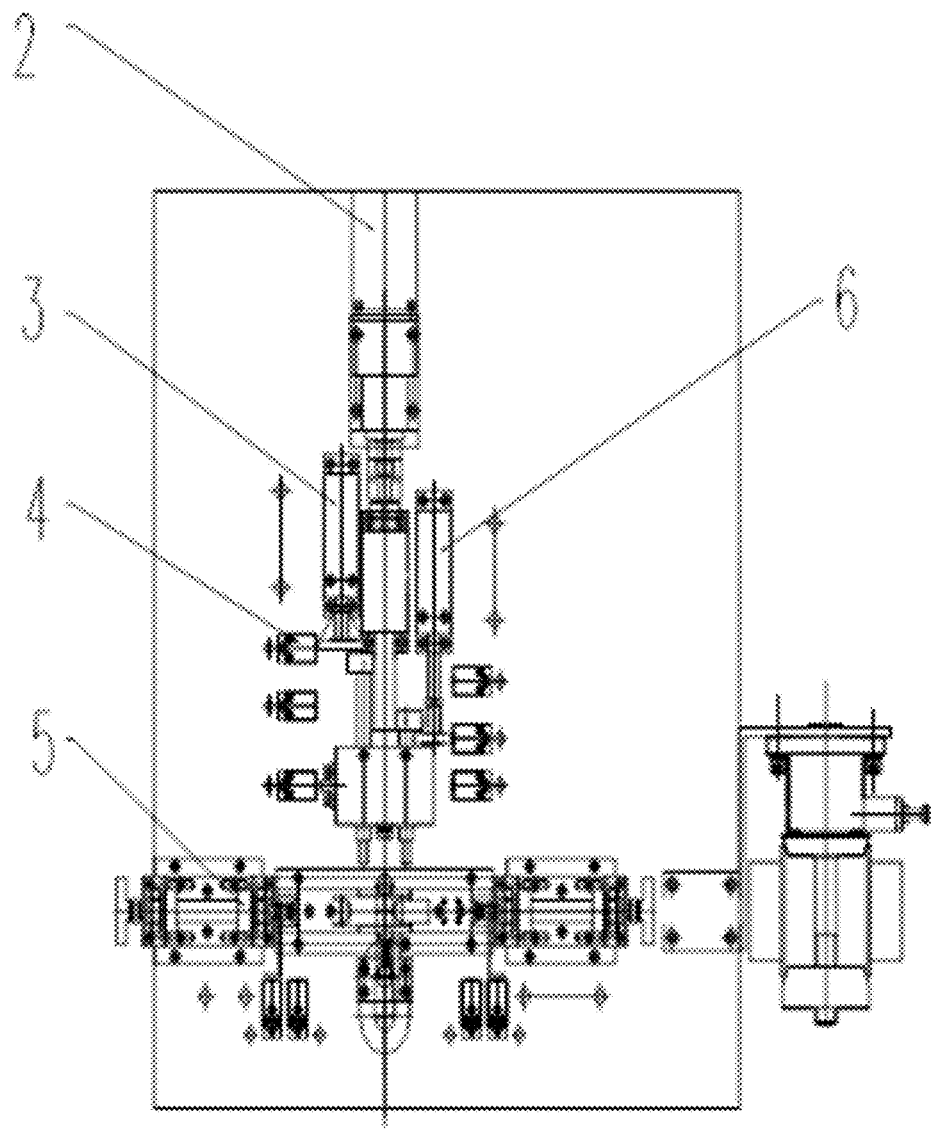
FIG. 1 is a schematic top view of a winding device for producing a fiber composite loop chain according to the present disclosure.
Figure 2:
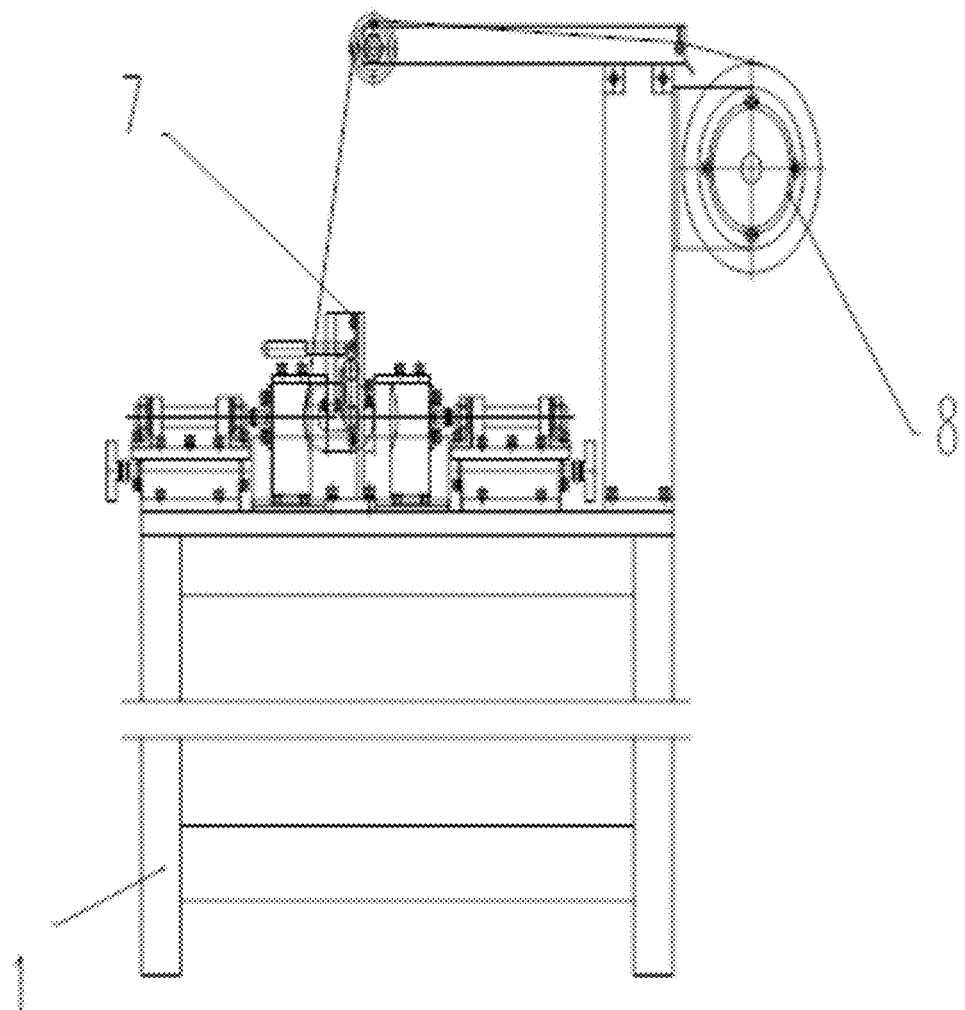
FIG. 2 is a schematic front view of a winding device for producing a fiber composite loop chain according to the present disclosure.

1: rack, 2: main shaft assembly, 3: clamp pushing-in mechanism, 4: travel switch assembly, 5: mold pushing mechanism, 6: clamp pulling-out mechanism, 7: positioning and clamping mechanism, 8: tension control mechanism, 9: winding fiber, 10: to-be-wound mold, 11: finished ring, 2-1: servo motor, 2-2: reducer, 2-3: coupler, 2-4: locking nut, 2-5: bearing pedestal, 2-6: bearing, 2-7: rotating main shaft, 2-8: clamp sliding shaft, 2-9: guide pin, 2-10: impact iron, 2-11: clamp, 2-12: clamp expansion block, 2-13: supporting block, 2-14: linear bearing, 3-1: ejection sleeve, 3-2: pushing-in air cylinder, 3-3: pushing-in air cylinder base, 4-1: proximity travel switch, 4-2: height adjusting frame, 4-3: fixing frame, 5-1-1: first pushing air cylinder, 5-1-2: second pushing air cylinder, 5-2: adjusting screw, 5-3: upper positioning plate, 5-4: clamping block, 5-5: sliding block, 5-6: track, 5-7: hand wheel, 5-8: guide groove, 6-1: pulling sleeve, 6-2: pulling-out air cylinder, 6-3: pulling-out air cylinder base, 7-1: support, 7-2: clamp forceps, 7-3: positioning block, 7-4: supporting plate, 7-5: positioning finished ring, 8-1: connecting support, 8-2: yarn guide groove, 8-3: yarn combing assembly, 8-4: yarn ball tensioner, 8-5: tension adjuster, 8-6: yarn ball, 8-7: yarn ball locking nut, 8-8: yarn guide wheel, 8-9: guide hinge pin, 8-10: wheel shaft, 4-1-1: first travel switch assembly, 4-1-2: second travel switch assembly, 4-1-3: third travel switch assembly, 4-1-4: fourth travel switch assembly, 4-1-5: fifth travel switch assembly, 4-1-6: sixth travel switch assembly, 4-1-7: seventh travel switch assembly, 4-1-8: eighth travel switch assembly, 4-1-9: ninth travel switch assembly, and 4-1-10: tenth travel switch assembly.

DETAILED DESCRIPTION

The technical solutions in embodiments of the present disclosure will be clearly and completely explained below in conjunction with the drawings in the embodiments of the present disclosure.

The implementation mode is illustrated with reference to FIG. 1 to FIG. 24. A winding device for producing a fiber composite loop chain includes a main shaft assembly 2, a clamp pushing-in mechanism 3, travel switch assemblies 4, a mold pushing mechanism 5, a clamp pulling-out mechanism 6, a positioning and clamping mechanism 7 and a tension control mechanism 8 which are fixedly connected to a rack 1. The main shaft assembly 2 includes a driving mechanism, a bearing pedestal 2-5, a rotating main shaft 2-7, clamp sliding shafts 2-8 and a supporting block 2-13. The driving mechanism is connected with one end of the rotating main shaft 2-7, and the other end of the rotating main shaft 2-7 is connected with the supporting block 2-13. The rotating main shaft 2-7 is connected with the bearing pedestal 2-5 through a bearing 2-6, and the bearing pedestal 2-5 is fixed onto the rack 1. Two clamp sliding shafts 2-8 are provided. The two clamp sliding shafts 2-8 are symmetrically arranged along the rotating main shaft 2-7; the clamp sliding shafts 2-8 are slidably connected with the supporting block 2-13; and each clamp sliding shaft 2-8 is provided with a clamp 2-11. The clamp pushing-in mechanism 3 and the clamp pulling-out mechanism 6 are respectively arranged at two sides of the main shaft assembly 2. The clamp pushing-in mechanism 3 pushes one clamp sliding shaft 2-8 through an air cylinder, and the clamp pulling-out mechanism 6 pulls the other clamp sliding shaft 2-8 through an air cylinder. The mold pushing mechanism 5 is arranged at a front end of the main shaft assembly 2. The mold pushing mechanism 5 includes a first pushing air cylinder 5-1-1, a second pushing air cylinder 5-1-2, clamping blocks 5-4 and a linear guide track. The first pushing air cylinder 5-1-1 and the second pushing air cylinder 5-1-2 are symmetrically arranged; a front end of each air cylinder rod is connected with a clamping block 5-4; and the two clamping blocks 5-4 are arranged oppositely. Bottom ends of the clamping blocks 5-4 are connected with the linear guide track. Multiple travel switch assemblies 4 are provided. The multiple travel switch assemblies 4 are respectively arranged at the positions of the clamp pushing-in mechanism 3, the clamp pulling-out mechanism 6, the supporting block 2-13, the first pushing air cylinder 5-1-1 and the second pushing air cylinder 5-1-2. The positioning and clamping mechanism 7 is arranged at a front end of the mold pushing mechanism 5. The positioning and clamping mechanism 7 includes a support 7-1, clamp forceps 7-2, a positioning block 7-3, a supporting plate 7-4 and a positioning finished ring 7-5. The support 7-1 is connected with the rack 1. The clamp forceps 7-2 are connected with the support 7-1 in a hinged manner. The positioning block 7-3 and the supporting plate 7-4 are fixedly connected with the support 7-1. The positioning finished ring 7-5 is assembled with the to-be-wound mold 10 and a finished ring 11 respectively in a sleeving manner. The positioning finished ring 7-5 is clamped on the positioning block 7-3 and the supporting plate 7-4. The tension control mechanism 8 provides winding tension for winding fibers 9 and guides the winding fibers 9 onto the to-be-wound mold 10.

Figure 3:
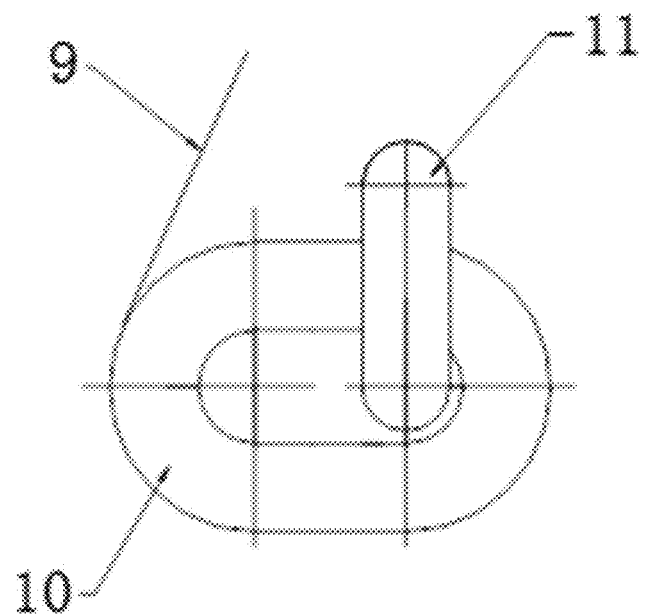
FIG. 3 is a loop chain winding schematic diagram I according to the present disclosure.
Figure 4:
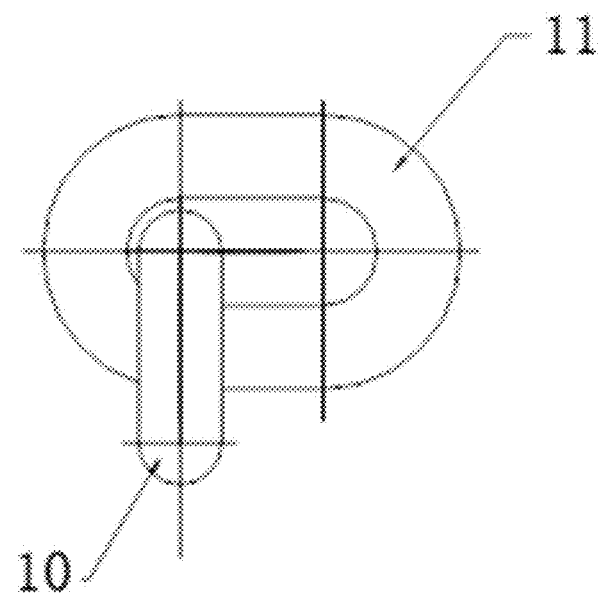
FIG. 4 is a side view of FIG. 3 according to the present disclosure.
Figure 5:
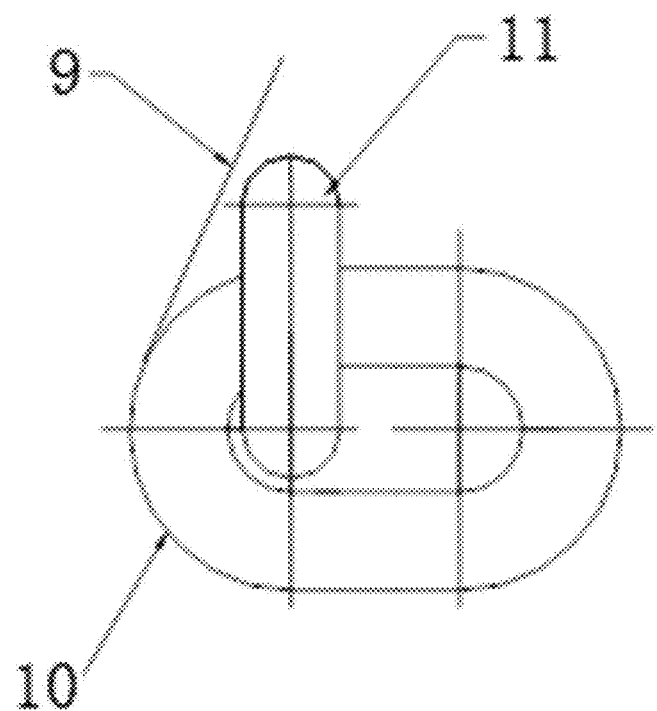
FIG. 5 is a loop chain winding schematic diagram II according to the present disclosure.
Figure 6:
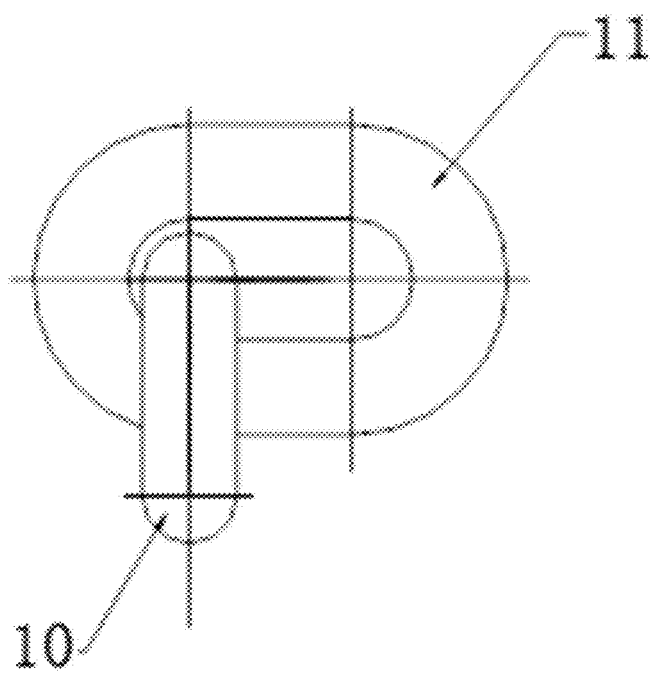
FIG. 6 is a side view of FIG. 5 according to the present disclosure.
Figure 7:
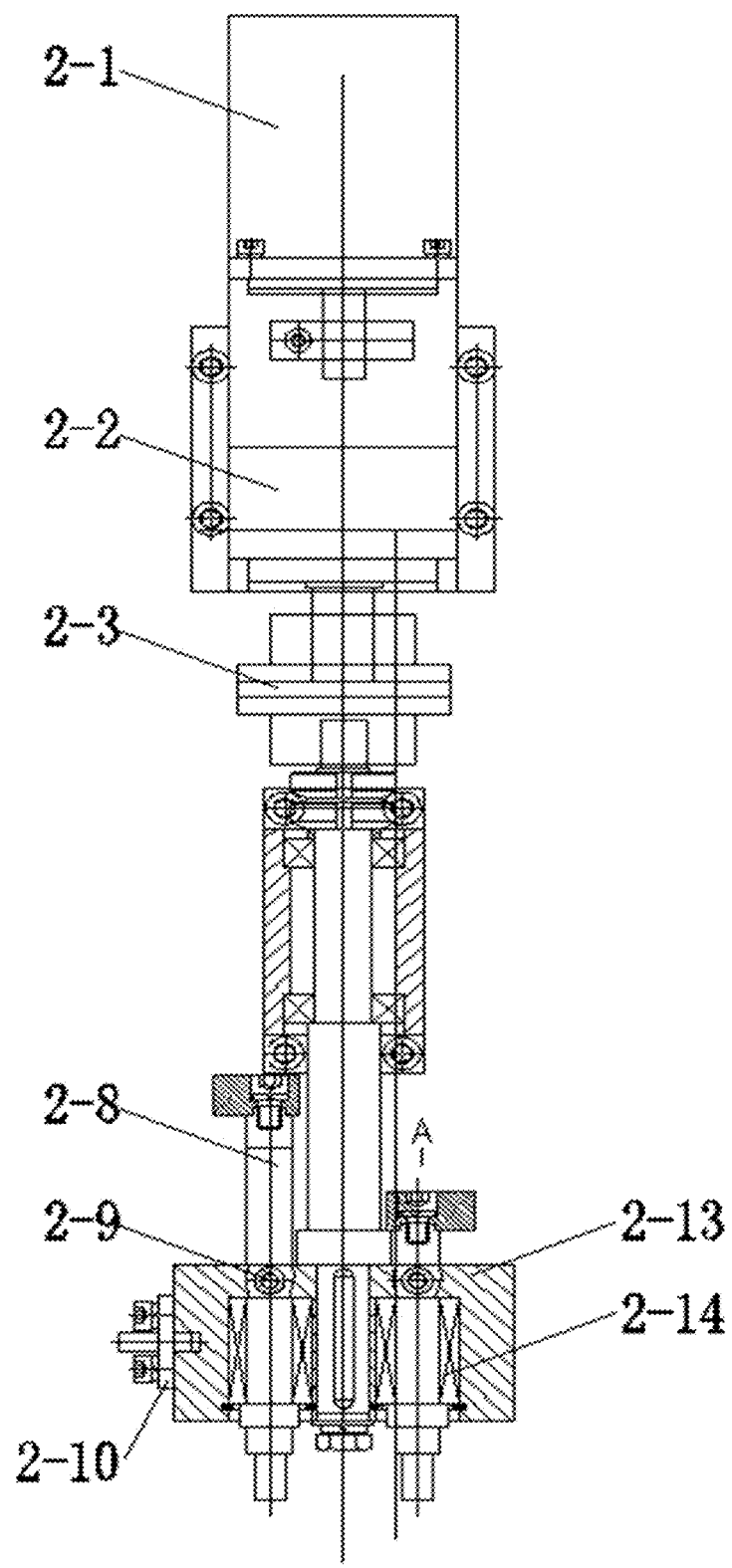
FIG. 7 is a schematic top view of a main shaft assembly according to the present disclosure.
Figure 8:
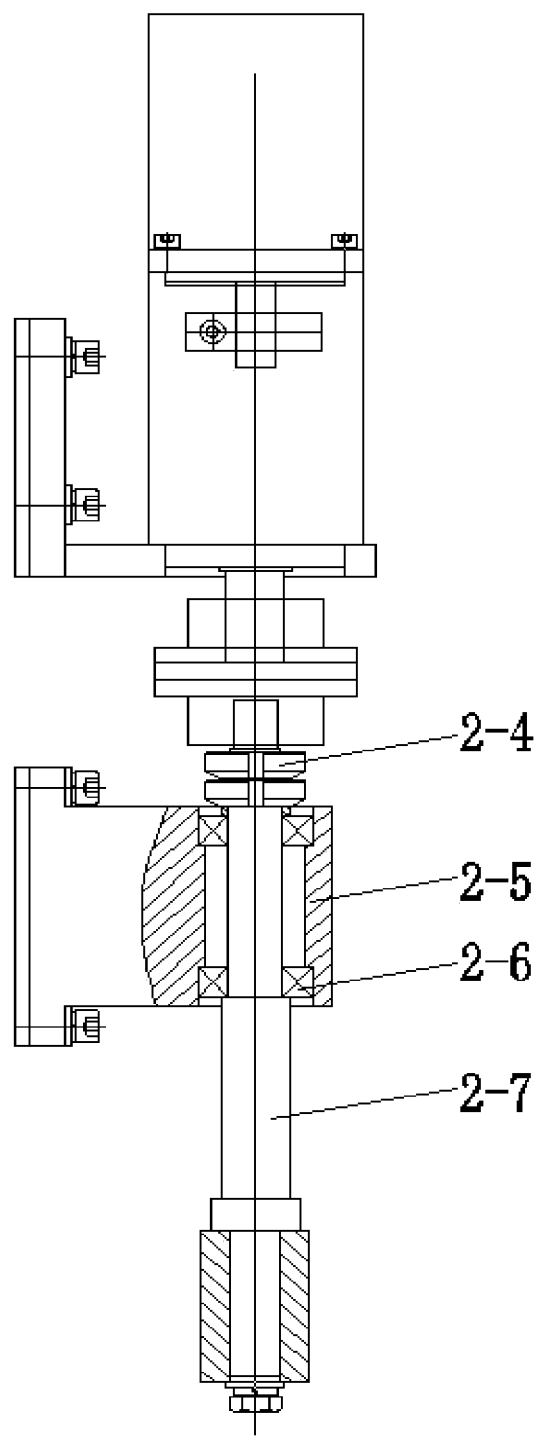
FIG. 8 is a schematic side view of a main shaft assembly according to the present disclosure.
Figure 9:
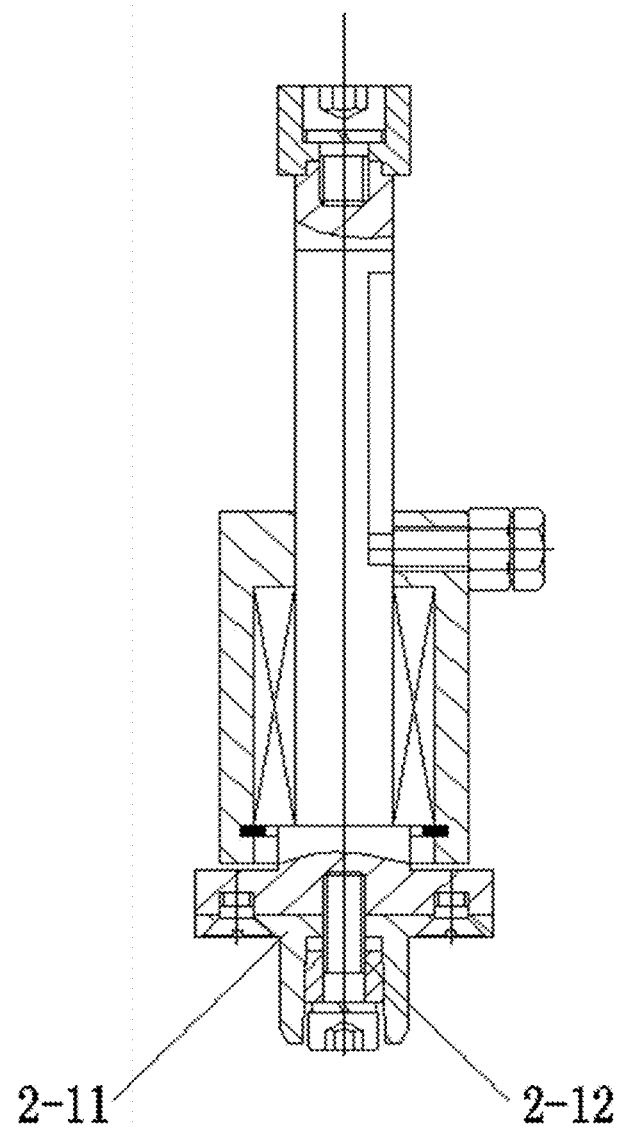
FIG. 9 is a schematic structural diagram illustrating connection of a clamp according to the present disclosure.

As shown in FIGS. 3-6, the working principle of the winding device is as follows: the to-be-wound mold 10, the finished ring 11 and the winding fibers 9 are placed on the positioning and clamping mechanism 7 according to the positional relationship in FIG. 3. The finished ring 11 is a positioning and clamping element. The to-be-wound mold 10 rotates anticlockwise by 180 degrees under the action of the main shaft assembly 2 to reach the position as shown in FIG. 5. The clamps 2-11 are pulled out, the to-be-wound mold 10 horizontally moves leftwards from the position as shown in FIG. 5 under the action of the mold pushing mechanism 5 and reaches the position as shown in FIG. 3, and thus, one circle of winding is completed. Winding of a whole loop may be completed by repeating the foregoing steps.

The rack 1 has a supporting effect. The main shaft assembly 2 has the effects of driving the to-be-wound mold 10 to rotate and intermittently stop according to designed logic actions during working, and overcoming winding tension to complete the whole winding work. The driving mechanism includes a servo motor 2-1 and a reducer 2-2. An output end of the servo motor 2-1 is connected with an input end of the reducer 2-2, and an output end of the reducer 2-2 is connected with the rotating main shaft 2-7 through a coupler 2-3. The servo motor 2-1 has the effects of driving the to-be-wound mold 10 to rotate and fulfilling a function of stopping and moving immediately in program actions. The reducer 2-2 has the effect of providing enough torque for the rotating main shaft 2-7 to overcome the winding tension, during installation, the servo motor 2-1 is directly inserted into an open locking sleeve of the input end of the reducer 2-2. A motor installation flange and a screw on the locking sleeve are locked, and thus, the servo motor 2-1 and the reducer 2-2 are connected integrally, and are fixed onto a reducer support. Torque is transmitted through the coupler 2-3 and concentric errors between the output shaft of the reducer 2-2 and the rotating main shaft 2-7 are overcome. The main shaft assembly 2 further includes a locking nut 2-4, a guide pin 2-9, impact iron 2-10, a clamp expansion block 2-12 and a linear bearing 2-14. The rotating main shaft 2-7 is locked onto the bearing pedestal 2-5 through the locking nut 2-4. An upper end of the guide pin 2-9 is fixed to the position of a center line of the clamp sliding shaft 2-8 in a threaded manner, and a lower end of the guide pin 2-9 is of a pin structure and is matched with an upper key slot in the clamp sliding shaft 2-8. The impact iron 2-10 is arranged at one side of the supporting block 2-13. The clamp expansion block 2-12 is of a wedge-shaped structure, and is arranged in a groove in a front end of the clamp 2-11. The linear bearing 2-14 is arranged between the clamp sliding shaft 2-8 and the supporting block 2-13. The locking nut 2-4 has the effects of locking the rotating main shaft 2-7 onto the bearing pedestal 2-5, preventing the axial movement of the rotating main shaft 2-7 and eliminating gaps. The bearing pedestal 2-5 is a supporting element, and limits the rotating main shaft 2-7 at a required position. The bearing 2-6 is fixed onto the bearing pedestal 2-5, and provides high-precision low-friction rotation for the rotating main shaft 2-7. The rotating main shaft 2-7 has the effect of driving the to-be-wound mold 10 to overcome the winding tension to achieve designed logic rotation actions. Two clamp sliding shafts 2-8 are provided in total, and are respectively mounted in linear bearings 2-14 at two sides of the main shaft of the supporting block 2-13. A front end of each clamp sliding shaft 2-8 is provided with the clamp 2-11 of the to-be-wound mold 10, and the clamp sliding shafts 2-8 have the effect of pushing in and pulling out the clamps 2-11 according to designed logic actions. The guide pin 2-9 has the effect of guaranteeing that the clamps 2-11 are always kept in the required direction during pushing-in and pulling-out actions, and meanwhile, the torque borne by the clamps 2-11 during winding rotation is overcome. The impact iron 2-10 has the effects of triggering travel switch signals and achieving continuous logic actions. Each clamp 2-11 is positioned at the front end of the corresponding clamp sliding shaft 2-8 through a key slot, and is fixed to the corresponding clamp sliding shaft 2-8 through a screw, and the clamps 2-11 have the effects of tightening the to-be-wound mold 10, overcoming the winding tension, and enabling the to-be-wound mold 10 to rotate according to logic requirements. The clamp expansion block 2-12 has the effects of adjusting the size of the clamps 2-11, and enabling the clamps 2-11 to be properly matched with the to-be-wound mold 10. The supporting block 2-13 has the effect of providing sufficient rigid support for the clamp sliding shafts 2-8. The linear bearings 2-14 have the effect of reducing the friction resistance of the clamp sliding shafts 2-8.

Figure 10:
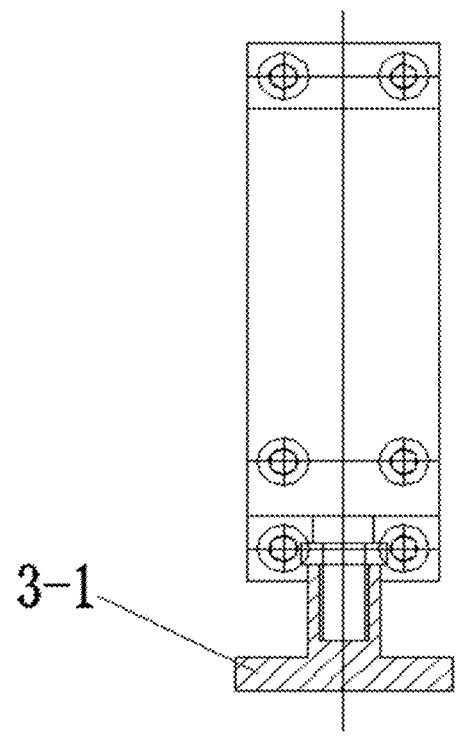
FIG. 10 is a schematic top view of a clamp pushing-in mechanism according to the present disclosure.
Figure 11:
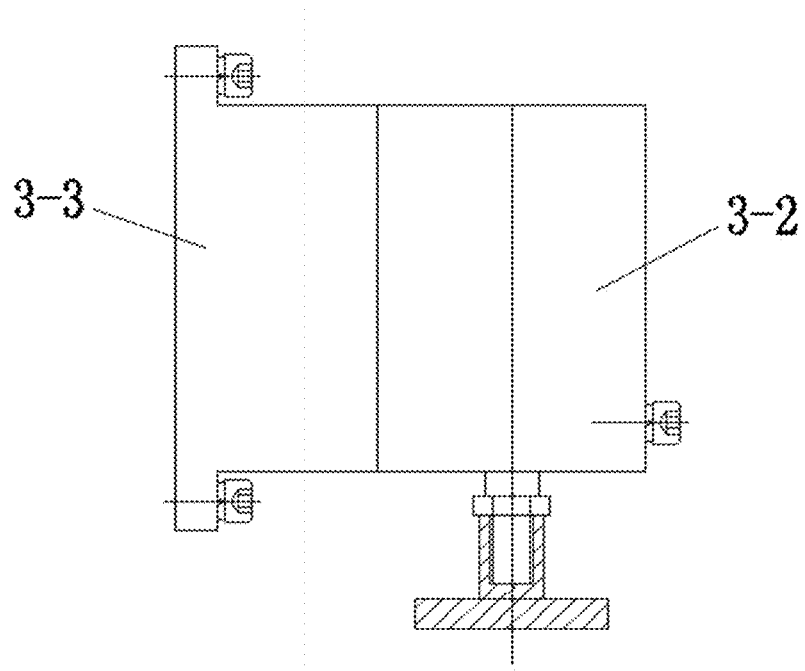
FIG. 11 is a schematic side view of a clamp pushing-in mechanism according to the present disclosure.
Figure 12:
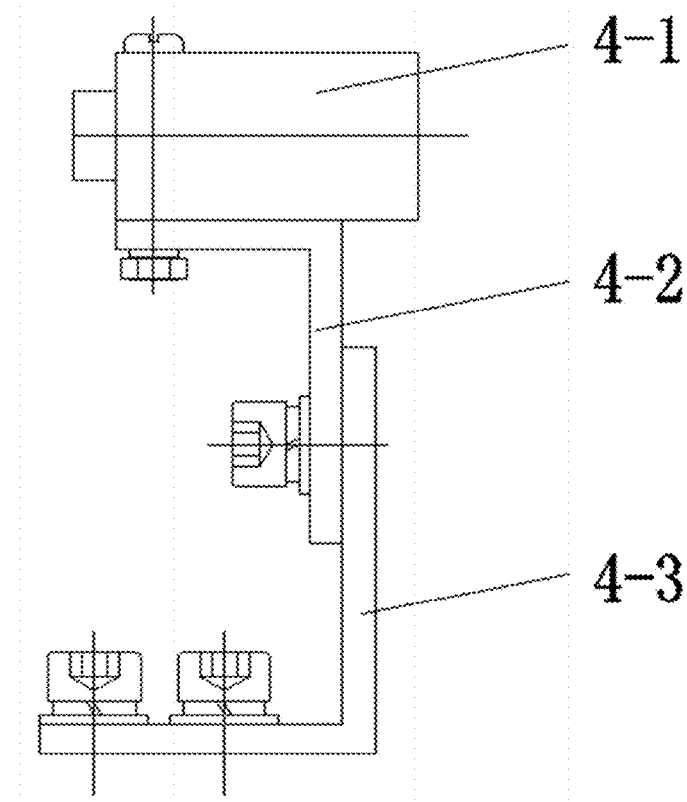
FIG. 12 is a schematic structural diagram of a travel switch assembly according to the present disclosure.
Figure 13:
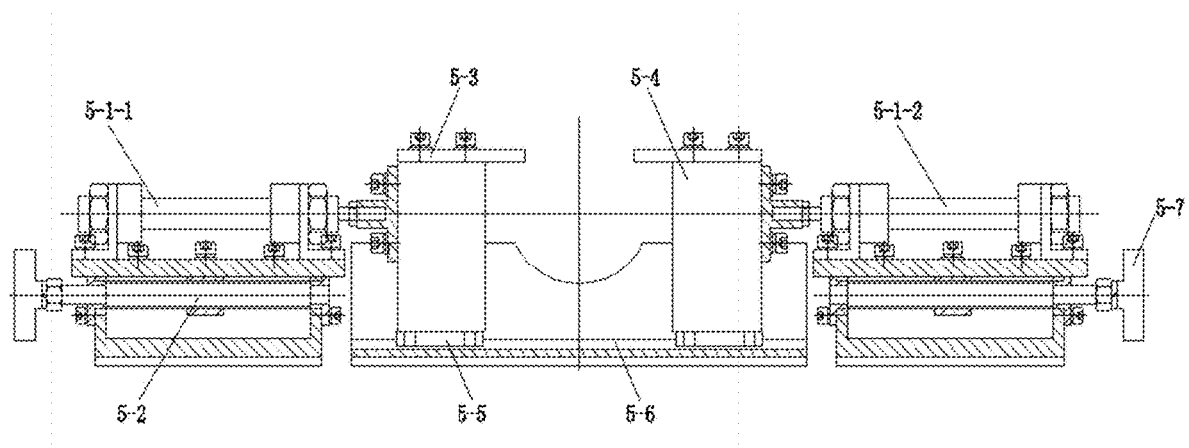
FIG. 13 is a schematic front view of a mold pushing mechanism according to the present disclosure.
Figure 14:
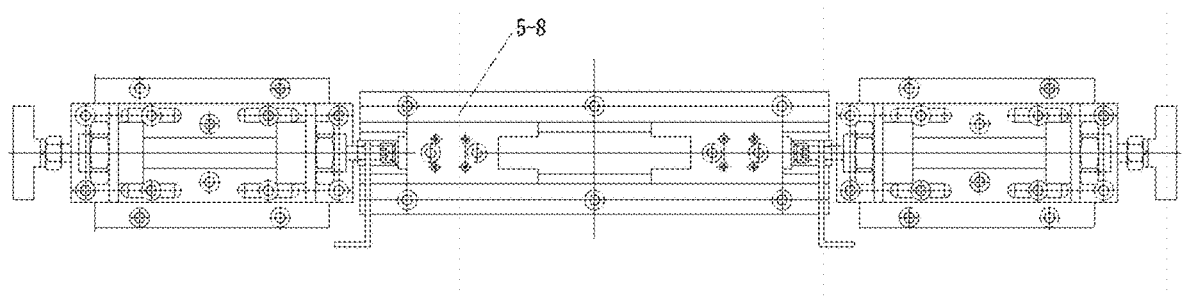
FIG. 14 is a schematic top view of a mold pushing mechanism according to the present disclosure.

The clamp pushing-in mechanism 3 has the effect of pushing the clamps 2-11 at the front ends of the clamp sliding shafts 2-8 into the to-be-wound mold 10 according to the requirements of the logic actions to complete winding actions. The position as shown in FIG. 10 is the position of the air cylinder during working, and after signals are received, the air cylinder ejects to push the clamps 2-11 in and then returns to the position as shown in the figure. The clamp pushing-in mechanism 3 includes an ejection sleeve 3-1 and a pushing-in air cylinder 3-2. The ejection sleeve 3-1 is connected with a cylinder rod of the pushing-in air cylinder 3-2. The pushing-in air cylinder 3-2 is connected with a pushing-in air cylinder base 3-3, and the pushing-in air cylinder base 3-3 is connected with the rack 1. The ejection sleeve 3-1 is connected with the pushing-in air cylinder 3-2 in a threaded manner, has the effect of pushing the clamp sliding shafts 2-8, and further serves as impact iron of the travel switch to trigger switching signals. The pushing-in air cylinder 3-2 has the effects of overcoming resistance and pushing the clamps 2-11 into the to-be-wound mold 10, and achieving logic actions under the action of an electronically controlled air valve. The pushing-in air cylinder base 3-3 supports the pushing-in air cylinder 3-2.

Figure 15:
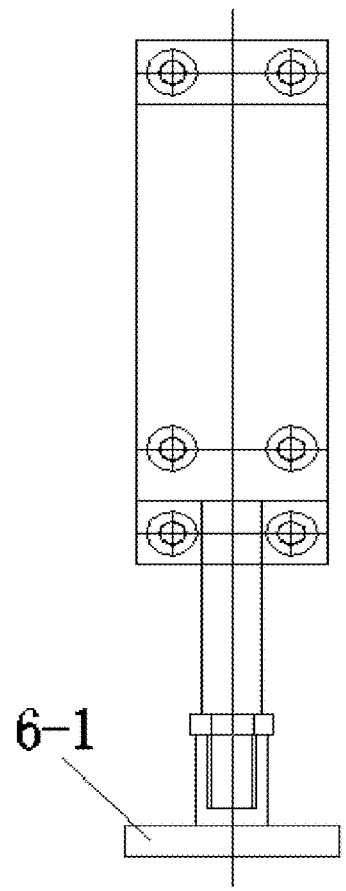
FIG. 15 is a schematic top view of a clamp pulling-out mechanism according to the present disclosure.
Figure 16:
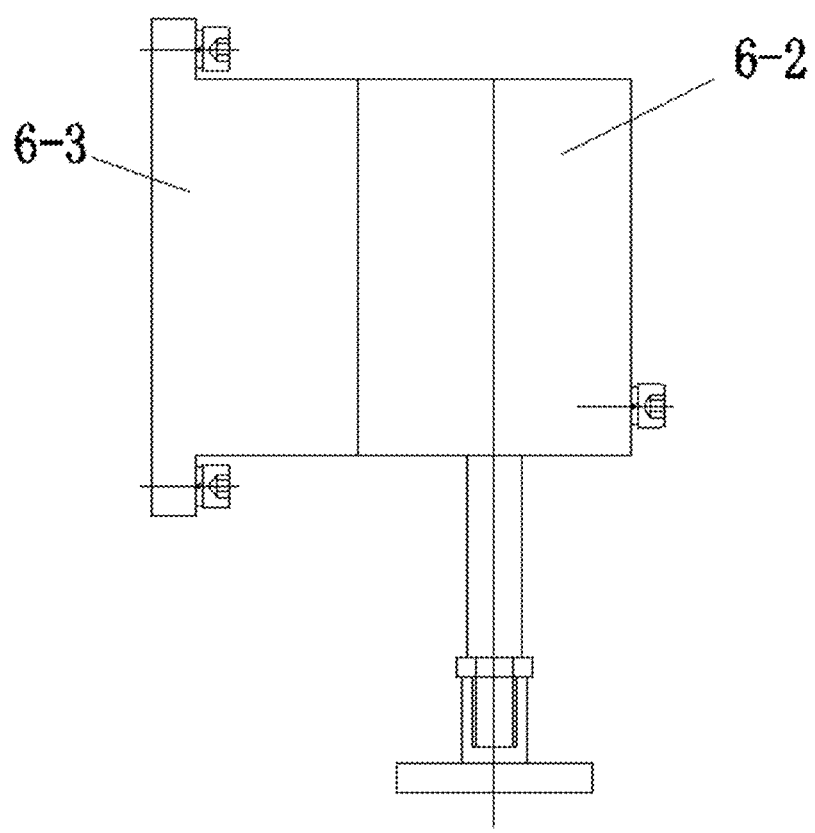
FIG. 16 is a schematic side view of a clamp pulling-out mechanism according to the present disclosure.

The clamp pulling-out mechanism 6 has the effects of pulling the clamps 2-11 at the front ends of the clamp sliding shafts 2-8 out of the to-be-wound mold 10 according to the requirements of the logic actions to complete winding actions. The position as shown in FIG. 15 is the position of the air cylinder during working, and after signals are received, the air cylinder is withdrawn, pulls out the clamps 2-11 and then returns to the position as shown in the figure. The clamp pulling-out mechanism 6 includes a pulling sleeve 6-1 and a pulling-out air cylinder 6-2. The pulling sleeve 6-1 is connected with a cylinder rod of the pulling-out air cylinder 6-2. The pulling-out air cylinder 6-2 is connected with a pulling-out air cylinder base 6-3, and the pulling-out air cylinder base 6-3 is connected with the rack 1. The pulling sleeve 6-1 is connected with the pulling-out air cylinder 6-2 in a threaded manner, has the effect of pulling the clamp sliding shafts 2-8, and further serves as impact iron of the travel switch to trigger switching signals. The pulling-out air cylinder 6-2 has the effects of overcoming resistance and pulling the clamps 2-11 out of the to-be-wound mold 10, and achieving logic actions under the action of the electronically controlled air valve. The pulling-out air cylinder base 6-3 supports the pulling-out air cylinder 6-2.

The travel switch assembly 4 includes a proximity travel switch 4-1, a height adjusting frame 4-2 and a fixing frame 4-3. The proximity travel switch 4-1 is in screwed connection weight the height adjusting frame 4-2, and the height adjusting frame 4-2 is in screwed connection with the fixing frame 4-3. The proximity travel switch 4-1 sends out signals under the action of the impact iron to trigger next action. The proximity travel switch 4-1 is connected with the height adjusting frame 4-2 through screws, and a gap between the proximity travel switch 4-1 and the impact iron is adjusted as needed. A sliding groove is formed in the height adjusting frame 4-2. The height adjusting frame 4-2 is locked to the fixing frame 4-3 through a screw, and the height can be adjusted by loosening the screw. The fixing frame 4-3 is connected with the rack 1 through a screw to position the proximity travel switch 4-1.

In the present embodiment, ten travel switch assemblies 4 are provided, and are respectively a first travel switch assembly 4-1-1, a second travel switch assembly 4-1-2, a third travel switch assembly 4-1-3, a fourth travel switch assembly 4-1-4, a fifth travel switch assembly 4-1-5, a sixth travel switch assembly 4-1-6, a seventh travel switch assembly 4-1-7, an eighth travel switch assembly 4-1-8, a ninth travel switch assembly 4-1-9 and a tenth travel switch assembly 4-1-10. The first travel switch assembly 4-1-1 and the second travel switch assembly 4-1-2 are arranged at two travel positions of the clamp pushing-in mechanism 3. The fourth travel switch assembly 4-1-4 and the fifth travel switch assembly 4-1-5 are arranged at two travel positions of the clamp pulling-out mechanism 6. The third travel switch assembly 4-1-3 and the sixth travel switch assembly 4-1-6 are symmetrically arranged at two sides of the supporting block 2-13. The seventh travel switch assembly 4-1-7 and the eighth travel switch assembly 4-1-8 are arranged at two travel positions of the first pushing air cylinder 5-1-1. The ninth travel switch assembly 4-1-9 and the tenth travel switch assembly 4-1-10 are arranged at two travel positions of the second pushing air cylinder 5-1-2. The ten travel switch assemblies 4 have dependence relationship, and are key signal sources for achieving required logic actions.

The mold pushing mechanism 5 clamps the to-be-wound mold 10 when the clamps 2-11 are pushed in and pulled out, and during the logic actions of the winding process, the to-be-wound mold 10 is pushed in a reciprocating manner. The mold pushing mechanism 5 further includes an adjusting screw 5-2, an upper positioning plate 5-3 and a guide groove 5-8. The adjusting screw 5-2 is connected with a base through front and rear ends by a sliding sleeve. The first pushing air cylinder 5-1-1 and the second pushing air cylinder 5-1-2 are respectively mounted on the base. One end of the adjusting screw 5-2 is connected with a hand wheel 5-7. The upper positioning plate 5-3 is fixedly connected onto the clamping blocks 5-4. The guide groove 5-8 is fixed on the rack 1. The clamping blocks 5-4 are connected with the guide groove 5-8 in a sliding fit manner. The linear guide track includes a sliding block 5-5 and a track 5-6. The clamping blocks 5-4 are fixedly connected with the sliding block 5-5. The sliding block 5-5 is slidably connected with the track 5-6. The first pushing air cylinder 5-1-1 and the second pushing air cylinder 5-1-2 are symmetrically arranged in the left-right direction. A front end of each air cylinder rod is in threaded connection with the corresponding clamping block 5-4 through a connecting block, and a bottom of each air cylinder is connected with a sliding plate through an air cylinder lug plate. The sliding plate is connected with the base through a nut and adjusting screw 5-2. The adjusting screws 5-2 have the effect of adjusting the positions of the air cylinders. The upper positioning plate 5-3 is fixed on the clamping blocks 5-4 through screws. During winding, a lower surface of the upper positioning plate 5-3 is abutted to an upper edge of the to-be-wound mold 10, thus, the purpose of rapidly mounting the to-be-wound mold 10 is achieved, and furthermore, the upper positioning plate 5-3 can offset part of winding tension. The clamping blocks 5-4 clamp the to-be-wound mold 10 during winding, bear the force generated by pushing-in and pulling-out of the clamps 2-11, and meanwhile, push the to-be-wound mold 10 in the left-right direction under the action of the air cylinders, so as to complete the whole logic action. Rear ends of the clamping blocks 5-4 are connected with the air cylinders; bottoms of the clamping blocks 5-4 are connected with the sliding block 5-5 of the linear guide track; upper portions of the clamping blocks 5-4 are connected with the upper positioning plate 5-3; the left and right clamping blocks 5-4 share one track 5-6, and thus, the coaxiality is guaranteed. The sliding block 5-5 and the track 5-6 are standard parts, and aim to reduce friction and guarantee kinematic accuracy. The hand wheel 5-7 is a standard part, and is used for conveniently adjusting the positions of the clamping blocks 5-4. The guide groove 5-8 is fixed on the rack 1 through screws, is an integrally processed groove-shaped part, is in sliding fit with the clamping blocks 5-4, and meanwhile, guide the to-be-wound mold 10 not to deviate when moving in a specified plane, and motion reliability is guaranteed integrally.

Figure 17:
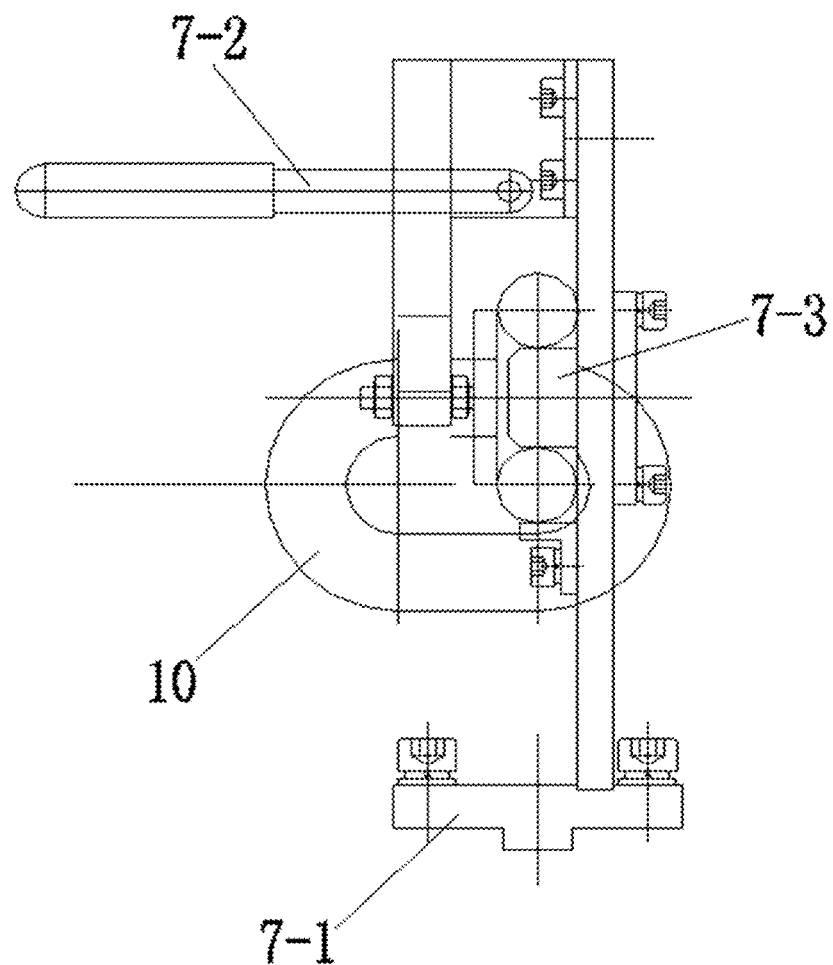
FIG. 17 is a schematic front view of a positioning and clamping mechanism according to the present disclosure.
Figure 18:
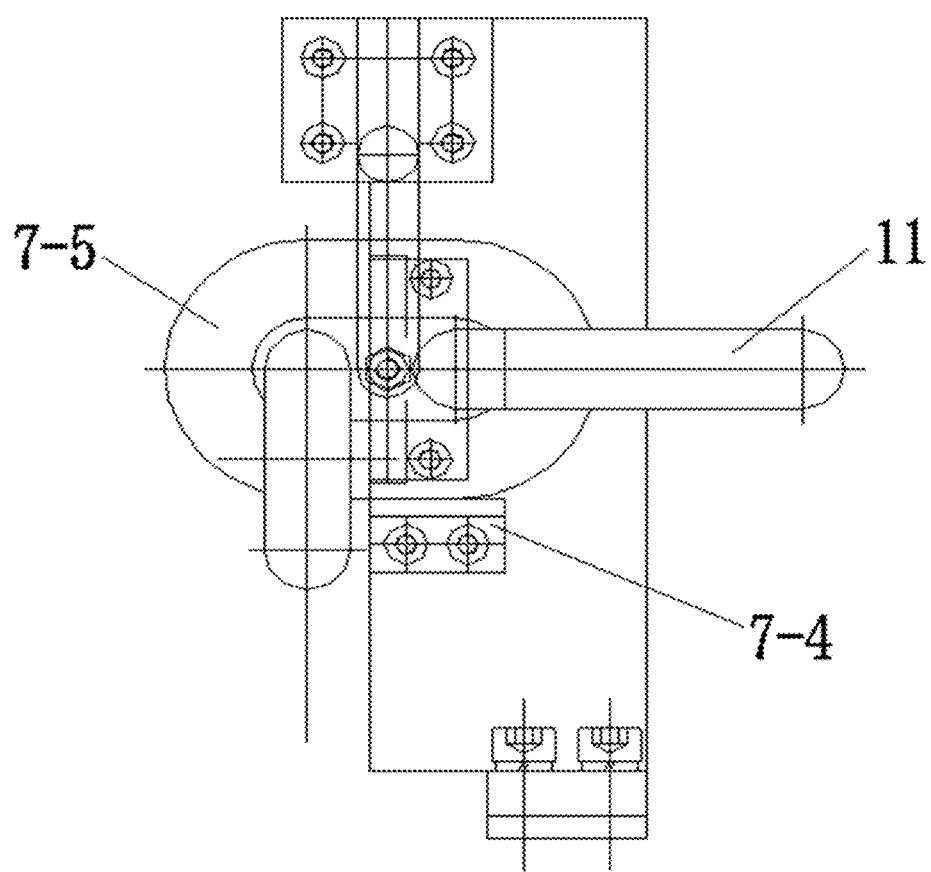
FIG. 18 is a schematic side view of a positioning and clamping mechanism according to the present disclosure.
Figure 19:
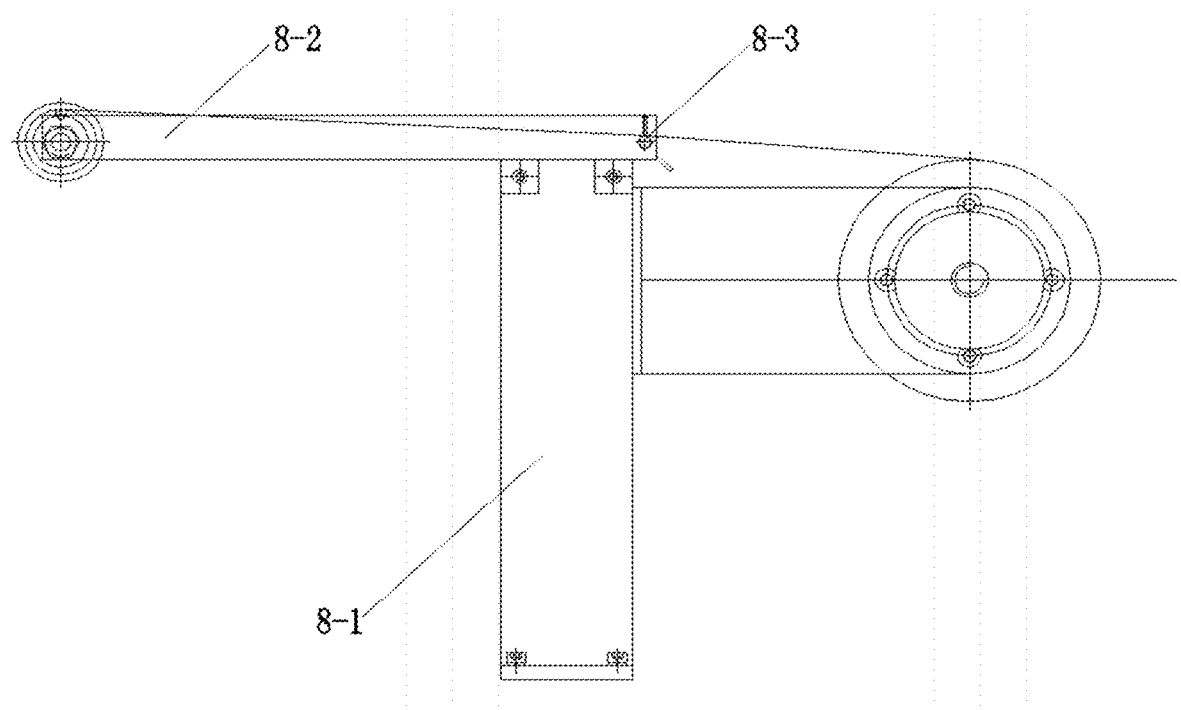
FIG. 19 is a schematic front view of a tension control mechanism according to the present disclosure.
Figure 20:
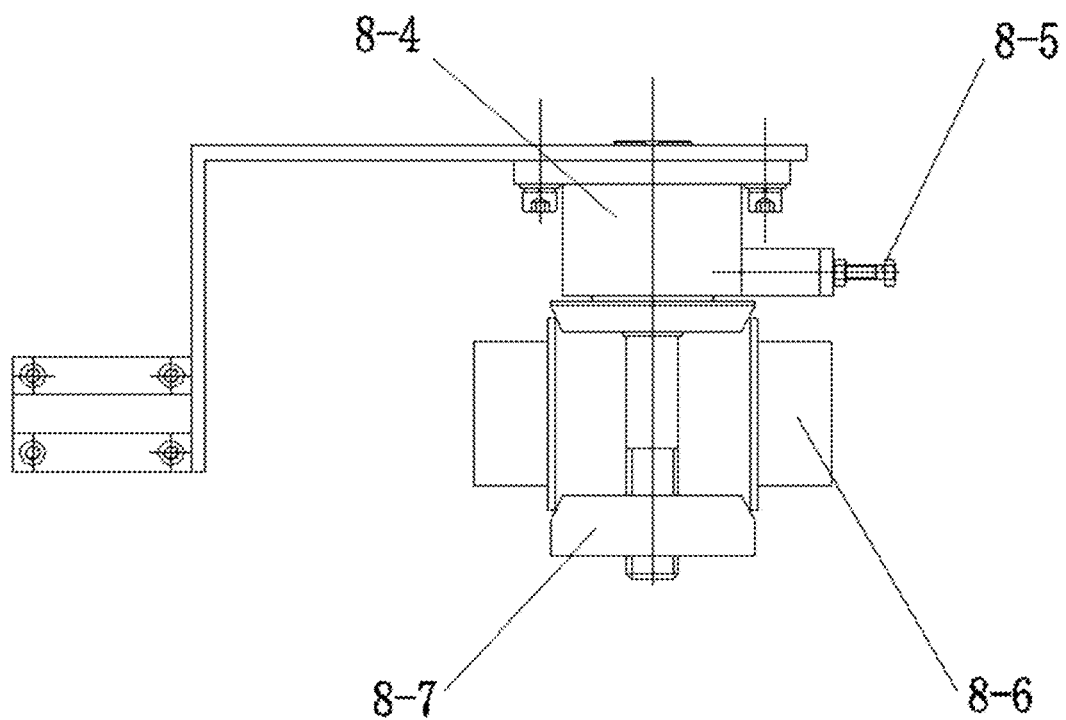
FIG. 20 is a schematic top view of a tension control mechanism according to the present disclosure.
Figure 21:
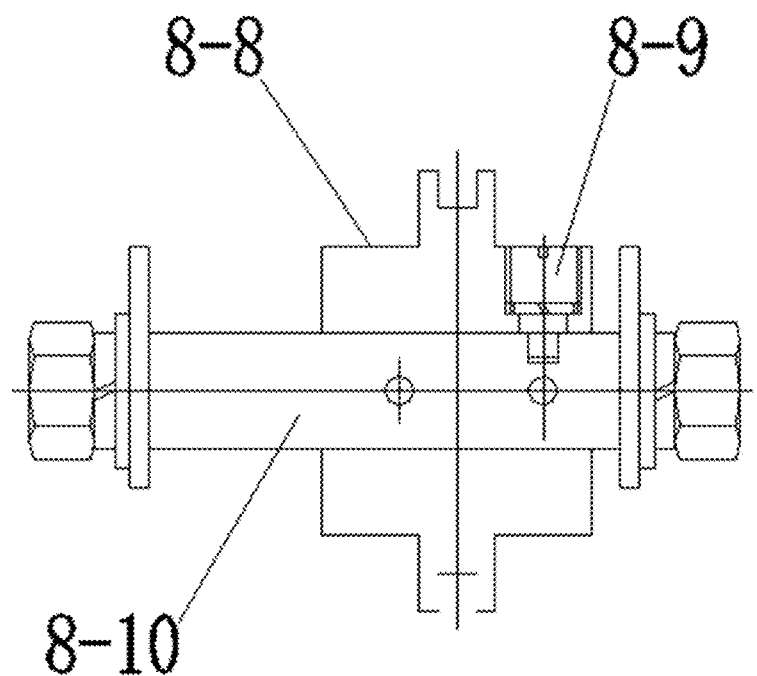
FIG. 21 is a schematic structural diagram illustrating installation of a yarn guide wheel according to the present disclosure.
Figure 22:
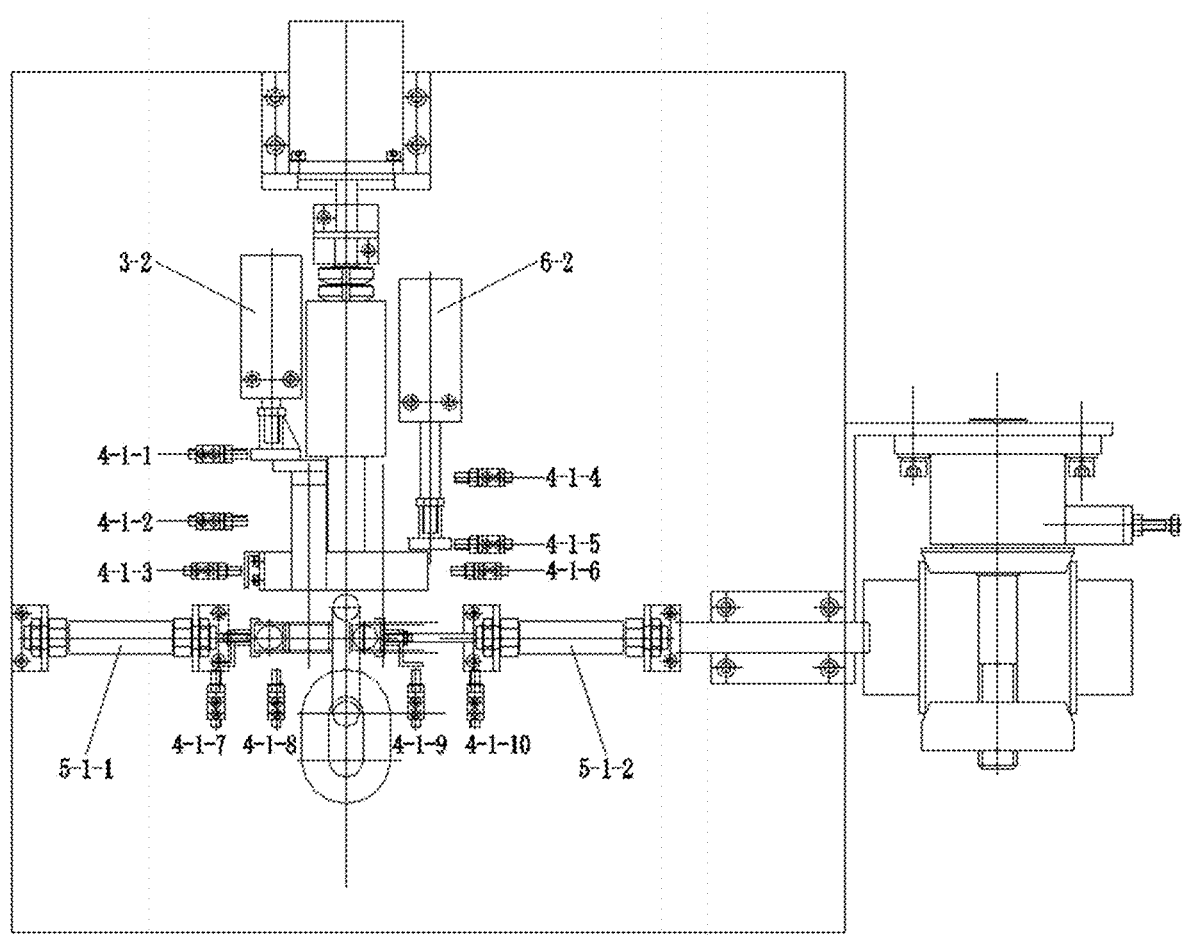
FIG. 22 is a schematic location diagram of a winding device at step 1 of a winding method according to the present disclosure.
Figure 23:
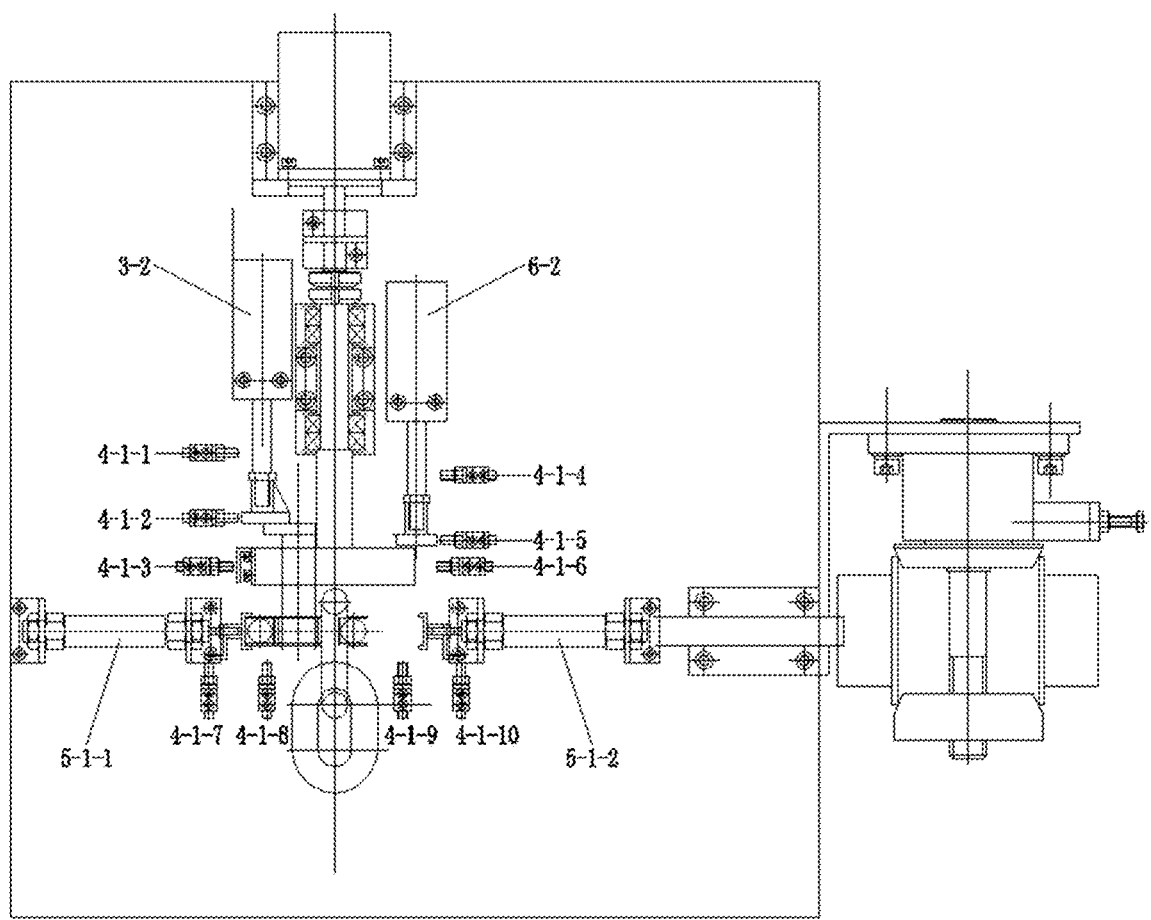
FIG. 23 is a schematic location diagram of a winding device at step 2 of a winding method according to the present disclosure.
Figure 24:
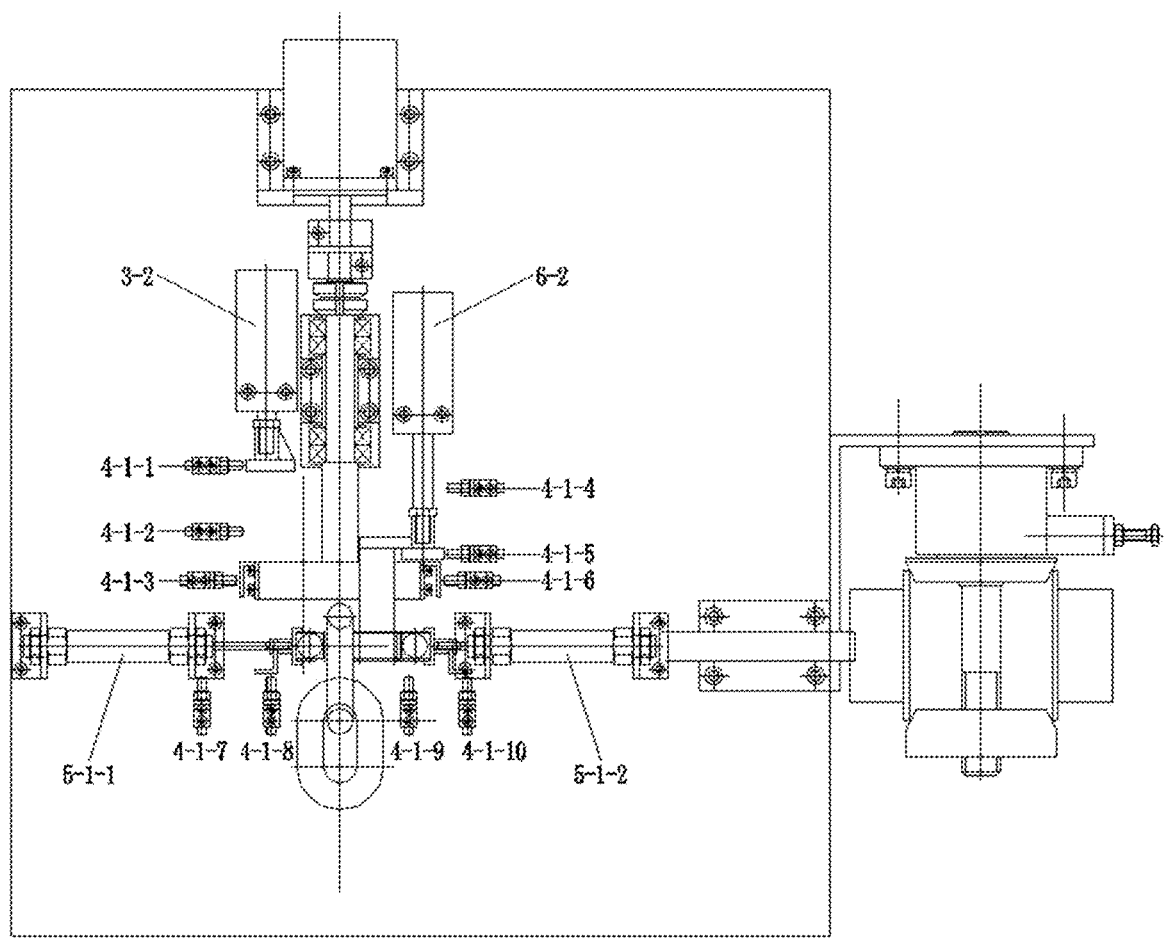
FIG. 24 is a schematic location diagram of a winding device at step 3 and step 4 of a winding method according to the present disclosure.

The positioning and clamping mechanism 7 has the effect of positioning the to-be-wound mold 10 at a required position during winding. The support 7-1 is of a welded processing structure, and is connected with the rack 1 through screws; and in order to guarantee precision, a positioning key is formed in the bottom of the support 7-1. The clamp forceps 7-2 are self-locking clamp forceps, and an adjustable pressing block is mounted at a clamping end of the clamp forceps 7-2. The width of the positioning block 7-3 is matched with the width of the middle of the finished ring 11, and the positioning block 7-3 is connected with the support 7-1 through screws. The supporting plate 7-4 is connected with the support 7-1 through screws, and has the effect of guaranteeing that the positioning finished ring 7-5 is positioned at a required position and keeps horizontal. During working, the to-be-wound mold 10 and the positioning finished ring 7-5 are mounted together in a sleeving manner; and the positioning finished ring 7-5 and the finished ring 11 are mounted together in a sleeving manner. As shown in FIG. 18, the positioning finished ring 7-5 is clamped onto the positioning block 7-3 and the supporting plate 7-4; the to-be-wound mold 10 is located at the position as shown in FIG. 17, and it is ensured that the to-be-wound mold 10 can freely rotate and move around the positioning finished ring 7-5. The clamp forceps 7-2 are pressed tightly to compact the positioning finished ring 7-5, so that the positioning finished ring 7-5 is fixed.

The tension control mechanism 8 is mainly used for providing proper winding tension for winding to smoothly wind fibers onto the to-be-wound mold 10. The tension control mechanism 8 includes a connecting support 8-1, a yarn guide groove 8-2, a yarn combing assembly 8-3, a yarn ball tensioner 8-4, a tension adjuster 8-5, a yarn ball 8-6, a yarn ball locking nut 8-7, a yarn guide wheel 8-8, a guide hinge pin 8-9 and a wheel shaft 8-10. The connecting support 8-1 is fixedly connected with the rack 1. The yarn guide groove 8-2 is connected with the connecting support 8-1. A yarn outlet end of the yarn guide groove 8-2 is provided with the yarn guide wheel 8-8, and a yarn inlet end is provided with the yarn combing assembly 8-3. The yarn ball tensioner 8-4 is connected with the connecting support 8-1. The tension adjuster 8-5 is connected with the yarn ball tensioner 8-4. The yarn ball 8-6 is arranged on the yarn ball tensioner 8-4. The yarn ball tensioner 8-4 locks the yarn ball 8-6 through the yarn ball locking nut 8-7. The yarn guide wheel 8-8 is connected with the wheel shaft 8-10 through the guide hinge pin 8-9. The wheel shaft 8-10 is connected with the yarn guide groove 8-2. The connecting support 8-1 is of a welding structure, and is connected with the rack 1 through screws. The yarn guide groove 8-2 is formed by bending a stainless steel sheet, and is connected with the connecting support 8-1 through screws. The yarn combing assembly 8-3 is made of wear-resistant hard alloy steel, and various surfaces of a yarn comb are processed smoothly to reduce friction resistance. The yarn ball tensioner 8-4 is used for bearing the yarn ball 8-6 and providing output tension. Required output tension is achieved by adjusting the tension adjuster 8-5. The yarn ball locking nut 8-7 is mounted through left-hand threads, and the actual turning direction of the yarn ball 8-6 during working is an anticlockwise direction. The yarn guide wheel 8-8 is of a groove-shaped structure integrally processed from alloy steel; the surface of the yarn guide wheel 8-8 is smooth and wear-resistant; and the yarn guide wheel 8-8 directly supplies yarns for the to-be-wound mold 10. The wheel shaft 8-10 is provided with a cam path which has the functions of a traverse unit. The guide hinge pin 8-9 is connected with the yarn guide wheel 8-8 in a threaded manner. During working, the yarn guide wheel 8-8 is mounted on the wheel shaft 8-10 in a sleeving manner; the guide hinge pin 8-9 is inserted into the cam path of the wheel shaft 8-10; when the yarn guide wheel 8-8 rotates, the guide hinge pin 8-9 may drive the yarn guide wheel 8-8 to move axially under the action of the cam path, and thus, an automatic unwinding purpose is achieved. The to-be-wound mold 10 is of a multi-petal split structure, and assembling in a sleeving mode and disassembling are facilitated.

According to the present embodiment, a winding method of the winding device includes the following steps.

Step 1: the to-be-wound mold 10 assembled with the finished ring 11 in a sleeving manner is clamped onto the positioning and clamping mechanism 7. The second pushing air cylinder 5-1-2 is controlled to eject to clamp the to-be-wound mold 10 between the clamping blocks 5-4. At this moment, the ejection sleeve 3-1 of the pushing-in air cylinder 3-2 triggers the first travel switch assembly 4-1-1; the impact iron 2-10 on the supporting block 2-13 triggers the third travel switch assembly 4-1-3; the pulling sleeve 6-1 of the pulling-out air cylinder 6-2 triggers the fifth travel switch assembly 4-1-5; the impact iron of the first pushing air cylinder 5-1-1 triggers the seventh travel switch assembly 4-1-7; and the impact iron of the second pushing air cylinder 5-1-2 triggers the ninth travel switch assembly 4-1-9.

Step 2: a winding start button is started; the air cylinder 3-2 ejects to push the clamps 2-11 into the to-be-wound mold 10, and then is withdrawn. At this movement, the ejection sleeve 3-1 of the pushing-in air cylinder 3-2 triggers the second travel switch assembly 4-1-2; the second pushing air cylinder 5-1-2 is withdrawn; and the impact iron of the second pushing air cylinder 5-1-2 triggers the tenth travel switch assembly 4-1-10.

Step 3: the rotating main shaft 2-7 drives the to-be-wound mold 10 to rotate anticlockwise by 180 degrees. At this moment, the impact iron 2-10 of the supporting block 2-13 triggers the sixth travel switch assembly 4-1-6; the first pushing air cylinder 5-1-1 ejects the to-be-wound mold 10; and meanwhile, the impact iron of the first pushing air cylinder 5-1-1 triggers the eighth travel switch assembly 4-1-8.

Step 4: the pulling-out air cylinder 6-2 is withdrawn to pull the clamps 2-11 out of the to-be-wound mold 10; the pulling sleeve 6-1 of the pulling-out air cylinder 6-2 triggers the fourth travel switch assembly 4-1-4 and then stretches out to return to the original position to trigger the fifth travel switch assembly 4-1-5; the second pushing air cylinder 5-1-2 ejects and pushes the to-be-wound mold 10 to move leftwards; the impact iron of the second pushing air cylinder 5-1-2 triggers the ninth travel switch assembly 4-1-9; the first pushing air cylinder 5-1-1 is withdrawn; the impact iron of the first pushing air cylinder 5-1-1 triggers the seventh travel switch assembly 4-1-7; and at this moment, the to-be-wound mold 10 returns to the initial position to complete semi-circle winding.

Step 5: the step 1 to the step 4 are repeated to complete winding of the loop chain.

The winding device for producing the fiber composite loop chain and the winding method provided by the present disclosure are described in detail. The principle and the implementation mode of the present disclosure are described by applying specific examples, and the description of the embodiments is only used for helping to understand the method and the core idea of the method; and meanwhile, to those of ordinary skill in the art, changes will be made in the specific implementation mode and scope of application in accordance with the spirit of the present disclosure. In conclusion, this specification should not be construed as limiting the present disclosure.

What is claimed is:

1. A winding device for producing a fiber composite loop chain, comprising a main shaft assembly (2), a clamp pushing-in mechanism (3), travel switch assemblies (4), a mold pushing mechanism (5), a clamp pulling-out mechanism (6), a positioning and clamping mechanism (7) and a tension control mechanism (8) being fixedly connected to a rack (1), wherein the main shaft assembly (2) comprises a driving mechanism, a bearing pedestal (2-5), a rotating main shaft (2-7), clamp sliding shafts (2-8) and a supporting block (2-13); the driving mechanism is connected with one end of the rotating main shaft (2-7), and the other end of the rotating main shaft (2-7) is connected with the supporting block (2-13); the rotating main shaft (2-7) is connected with the bearing pedestal (2-5) through a bearing (2-6), and the bearing pedestal (2-5) is fixed on the rack (1); two clamp sliding shafts (2-8) are provided, the two clamp sliding shafts (2-8) are symmetrically arranged along the rotating main shaft (2-7), the clamp sliding shafts (2-8) are slidably connected with the supporting block (2-13), and each clamp sliding shaft (2-8) is provided with a clamp (2-11); the clamp pushing-in mechanism (3) and the clamp pulling-out mechanism (6) are arranged at two sides of the main shaft assembly (2), respectively, the clamp pushing-in mechanism (3) pushes one clamp sliding shaft (2-8) through an air cylinder, and the clamp pulling-out mechanism (6) pulls the other clamp sliding shaft (2-8) through an air cylinder; the mold pushing mechanism (5) is arranged at a front end of the main shaft assembly (2), and the mold pushing mechanism (5) comprises a first pushing air cylinder (5-1-1), a second pushing air cylinder (5-1-2), clamping blocks (5-4) and a linear guide track; the first pushing air cylinder (5-1-1) and the second pushing air cylinder (5-1-2) are arranged symmetrically, a front end of each air cylinder rod is connected with a clamping block (5-4), the two clamping blocks (5-4) are arranged oppositely, and bottom ends of the clamping blocks (5-4) are connected with the linear guide track; multiple travel switch assemblies (4) are provided, and the multiple travel switch assemblies (4) are arranged at the positions of the clamp pushing-in mechanism (3), the clamp pulling-out mechanism (6), the supporting block (2-13), the first pushing air cylinder (5-1-1) and the second pushing air cylinder (5-1-2), respectively; the positioning and clamping mechanism (7) is arranged at a front end of the mold pushing mechanism (5), and the positioning and clamping mechanism (7) comprises a support (7-1), clamp forceps (7-2), a positioning block (7-3), a supporting plate (7-4) and a positioning finished ring (7-5); the support (7-1) is connected with the rack (1); the clamp forceps (7-2) are connected with the support (7-1) in a hinged manner; the positioning block (7-3) and the supporting plate (7-4) are both fixedly connected with the support (7-1); the positioning finished ring (7-5) is separately assembled with a to-be-wound mold (10) and a finished ring (11) in a sleeving manner; the positioning finished ring (7-5) is clamped on the positioning block (7-3) and the supporting plate (7-4); and the tension control mechanism (8) provides winding tension for winding fibers (9) and guides the winding fibers (9) to the to-be-wound mold (10).

2. The winding device according to claim 1, wherein the driving mechanism comprises a servo motor (2-1) and a reducer (2-2), an output end of the servo motor (2-1) is connected with an input end of the reducer (2-2), and an output end of the reducer (2-2) is connected with the rotating main shaft (2-7) through a coupler (2-3).

3. The winding device according to claim 1, wherein the main shaft assembly (2) further comprises a locking nut (2-4), a guide pin (2-9), impact iron (2-10), a clamp expansion block (2-12) and a linear bearing (2-14); the rotating main shaft (2-7) is locked onto the bearing pedestal (2-5) through the locking nut (2-4), an upper end of the guide pin (2-9) is fixed to the position of a center line of the clamp sliding shaft (2-8) in a threaded manner, a lower end of the guide pin (2-9) is of a pin structure and is matched with an upper key slot of the clamp sliding shaft (2-8), the impact iron (2-10) is arranged at one side of the supporting block (2-13), the clamp expansion block (2-12) is of a wedge-shaped structure, and is arranged in a groove at a front end of the clamp (2-11), and the linear bearing (2-14) is arranged between the clamp sliding shaft (2-8) and the supporting block (2-13).

4. The winding device according to claim 1, wherein the clamp pushing-in mechanism (3) comprises an ejection sleeve (3-1) and a pushing-in air cylinder (3-2), the ejection sleeve (3-1) is connected with a cylinder rod of the pushing-in air cylinder (3-2), the pushing-in air cylinder (3-2) is connected with a pushing-in air cylinder base (3-3), and the pushing-in air cylinder base (3-3) is connected with the rack (1); the clamp pulling-out mechanism (6) comprises a pulling sleeve (6-1) and a pulling-out air cylinder (6-2), the pulling sleeve (6-1) is connected with a cylinder rod of the pulling-out air cylinder (6-2), the pulling-out air cylinder (6-2) is connected with a pulling-out air cylinder base (6-3), and the pulling-out air cylinder base (6-3) is connected with the rack (1).

5. The winding device according to claim 1, wherein the travel switch assembly (4) comprises a proximity travel switch (4-1), a height adjusting frame (4-2) and a fixing frame (4-3), the proximity travel switch (4-1) is in screwed connection with the height adjusting frame (4-2), and the height adjusting frame (4-2) is in screwed connection with the fixing frame (4-3).

6. The winding device according to claim 1, wherein the mold pushing mechanism (5) further comprises an adjusting screw (5-2), an upper positioning plate (5-3) and a guide groove (5-8), the adjusting screw (5-2) is connected with a base through front and rear ends by a sliding sleeve, the first pushing air cylinder (5-1-1) and the second pushing air cylinder (5-1-2) are separately mounted on the base, one end of the adjusting screw (5-2) is connected with a hand wheel (5-7), the upper positioning plate (5-3) is fixedly connected onto the clamping blocks (5-4), the guide groove (5-8) is fixed on the rack (1), the clamping blocks (5-4) are connected with the guide groove (5-8) in a sliding fit manner, the linear guide track comprises a sliding block (5-5) and a track (5-6), the clamping block (5-4) is fixedly connected with the sliding block (5-5), and the sliding block (5-5) is in sliding connection with the track (5-6).

7. The winding device according to claim 1, wherein the tension control mechanism (8) comprises a connecting support (8-1), a yarn guide groove (8-2), a yarn combing assembly (8-3), a yarn ball tensioner (8-4), a tension adjuster (8-5), a yarn ball (8-6), a yarn ball locking nut (8-7), a yarn guide wheel (8-8), a guide hinge pin (8-9) and a wheel shaft (8-10), the connecting support (8-1) is fixedly connected with the rack (1), the yarn guide groove (8-2) is connected with the connecting support (8-1), a yarn outlet end of the yarn guide groove (8-2) is provided with the yarn guide wheel (8-8), a yarn inlet end of the yarn guide groove (8-2) is provided with the yarn combing assembly (8-3), the yarn ball tensioner (8-4) is connected with the connecting support (8-1), the tension adjuster (8-5) is connected with the yarn ball tensioner (8-4), the yarn ball (8-6) is arranged on the yarn ball tensioner (8-4), the yarn ball tensioner (8-4) locks the yarn ball (8-6) through the yarn ball locking nut (8-7), the yarn guide wheel (8-8) is connected with the wheel shaft (8-10) through the guide hinge pin (8-9), and the wheel shaft (8-10) is connected with the yarn guide groove (8-2).

8. The winding device according to claim 1, wherein the to-be-wound mold (10) is of a multi-petal split structure.

9. The winding device according to claim 1, wherein ten travel switch assemblies (4) are provided, and are a first travel switch assembly (4-1-1), a second travel switch assembly (4-1-2), a third travel switch assembly (4-1-3), a fourth travel switch assembly (4-1-4), a fifth travel switch assembly (4-1-5), a sixth travel switch assembly (4-1-6), a seventh travel switch assembly (4-1-7), an eighth travel switch assembly (4-1-8), a ninth travel switch assembly (4-1-9) and a tenth travel switch assembly (4-1-10), respectively, the first travel switch assembly (4-1-1) and the second travel switch assembly (4-1-2) are arranged at two travel positions of the clamp pushing-in mechanism (3), the fourth travel switch assembly (4-1-4) and the fifth travel switch assembly (4-1-5) are arranged at two travel positions of the clamp pulling-out mechanism (6), the third travel switch assembly (4-1-3) and the sixth travel switch assembly (4-1-6) are symmetrically arranged at two sides of the supporting block (2-13), the seventh travel switch assembly (4-1-7) and the eighth travel switch assembly (4-1-8) are arranged at two travel positions of the first pushing air cylinder (5-1-1), and the ninth travel switch assembly (4-1-9) and the tenth travel switch assembly (4-1-10) are arranged at two travel positions of the second pushing air cylinder (5-1-2).

10. A method of using the winding device according to claim 1, comprising the following steps:
step 1: clamping the to-be-wound mold (10) assembled with the finished ring (11) in a sleeving manner onto the positioning and clamping mechanism (7), controlling the second pushing air cylinder (5-1-2) to eject so as to clamp the to-be-wound mold (10) between clamping blocks (5-4), at this moment, enabling the ejection sleeve (3-1) of the pushing-in air cylinder (3-2) to trigger the first travel switch assembly (4-1-1), enabling the impact iron (2-10) on the supporting block (2-13) to trigger the third travel switch assembly (4-1-3), enabling the pulling sleeve (6-1) of the pulling-out air cylinder (6-2) to trigger the fifth travel switch assembly (4-1-5), enabling the impact iron of the first pushing air cylinder (5-1-1) to trigger the seventh travel switch assembly (4-1-7), and enabling the impact iron of the second pushing air cylinder (5-1-2) to trigger the ninth travel switch assembly (4-1-9);

step 2: starting a winding start button, enabling the air cylinder (3-2) to eject so as to push the clamp (2-11) into the to-be-wound mold (10) and then withdrawing the air cylinder (3-2), at this moment, enabling the ejection sleeve (3-1) of the pushing-in air cylinder (3-2) to trigger the second travel switch assembly (4-1-2), withdrawing the second pushing air cylinder (5-1-2), and enabling the impact iron of the second pushing air cylinder (5-1-2) to trigger the tenth travel switch assembly (4-1-10);

step 3: driving the to-be-wound mold (10) to rotate anticlockwise by 180 degrees through the rotating main shaft (2-7), at this moment, enabling the impact iron (2-10) on the supporting block (2-13) to trigger the sixth travel switch assembly (4-1-6), enabling the first pushing air cylinder (5-1-1) to eject the to-be-wound mold (10), and meanwhile, enabling the impact iron of the first pushing air cylinder (5-1-1) to trigger the eighth travel switch assembly (4-1-8);

step 4: withdrawing the pulling-out air cylinder (6-2), pulling the clamp (2-11) out of the to-be-wound mold (10), enabling the pulling sleeve (6-1) of the pulling-out air cylinder (6-2) to trigger the fourth travel switch assembly (4-1-4) and then stretch out to return to the original position to trigger the fifth travel switch assembly (4-1-5), enabling the second pushing air cylinder (5-1-2) to eject and push the to-be-wound mold (10) to move leftwards, enabling the impact iron of the second pushing air cylinder (5-1-2) to trigger the ninth travel switch assembly (4-1-9), withdrawing the first pushing air cylinder (5-1-1), enabling the impact iron of the first pushing air cylinder (5-1-1) to trigger the seventh travel switch assembly (4-1-7), and at this moment, enabling the to-be-wound mold (10) to return to the initial position to complete semi-circle winding; and step 5: repeating the steps 1 to 4 to complete winding of the loop chain.

* * * * *